(12) United States Patent
Griess et al.

(10) Patent No.: US 10,035,323 B2
(45) Date of Patent: Jul. 31, 2018

(54) COMPOSITE TEXTILES INCLUDING SPREAD FILAMENTS

(71) Applicant: The Boeing Company, Chicago, IL (US)

(72) Inventors: Kenneth H. Griess, Kent, WA (US); Jack J. Esposito, Auburn, WA (US); Gary E. Georgeson, Tacoma, WA (US)

(73) Assignee: The Boeing Company, Chicago, IL (US)

( * ) Notice: Subject to any disclaimer, the term of this patent is extended or adjusted under 35 U.S.C. 154(b) by 201 days.

(21) Appl. No.: 14/034,456

(22) Filed: Sep. 23, 2013

(65) Prior Publication Data

US 2015/0086745 A1 Mar. 26, 2015

(51) Int. Cl.
*B32B 3/06* (2006.01)
*B64C 1/06* (2006.01)
(Continued)

(52) U.S. Cl.
CPC ............ *B32B 3/06* (2013.01); *B29C 37/0082* (2013.01); *B29C 70/22* (2013.01); *B29C 70/30* (2013.01); *B29C 70/86* (2013.01); *B29C 73/10* (2013.01); *B32B 5/26* (2013.01); *B32B 7/12* (2013.01); *B32B 43/00* (2013.01); *B29L 2031/3076* (2013.01); *B32B 2260/021* (2013.01); *B32B 2260/046* (2013.01); *B32B 2262/101* (2013.01);
(Continued)

(58) Field of Classification Search
CPC ..... B29C 37/0082; B29C 70/22; B29C 70/30; B29C 70/86; B29C 79/10; Y02T 50/0433; Y10T 428/20; Y10T 428/219; Y10T 428/2476; B32B 3/06; B32B 43/00; B32B 5/26; B32B 7/12; B32B 2260/021; B32B 2260/046; B32B 2262/101; B32B 2262/106; B32B 2556/00; B32B 26/05; B64C 1/062; B64C 2011/0072
USPC ............ 442/60, 189, 334; 428/63, 190, 66.7
See application file for complete search history.

(56) References Cited

U.S. PATENT DOCUMENTS 1,261,118 A * 4/1918 Geisel ..................... B29C 66/43
156/137
2,308,760 A * 1/1943 Kallenbach ............ D03D 29/00
139/1 R
(Continued)

FOREIGN PATENT DOCUMENTS

EP 0839635 B1 3/2001
EP 2033769 A1 3/2009
(Continued)

OTHER PUBLICATIONS

Chinese Office Action for Related Patent Application No. 2014104230996; Report dated Nov. 3, 2017.
(Continued)

*Primary Examiner* — Nancy R Johnson
*Assistant Examiner* — Michael Zhang
(74) *Attorney, Agent, or Firm* — Miller, Matthias & Hull LLP

(57) ABSTRACT

An article comprises a multi-directional textile of first reinforcing fiber tows extending in a first direction and second reinforcing fiber tows extending in a second direction. Filaments in the first fiber tows extend past a boundary of the textile and are spread. The tows are embedded in resin.

19 Claims, 6 Drawing Sheets

(51) Int. Cl.
*B32B 5/02* (2006.01)
*B32B 43/00* (2006.01)
*B29C 70/86* (2006.01)
*B29C 73/10* (2006.01)
*B29C 37/00* (2006.01)
*B29C 70/22* (2006.01)
*B29C 70/30* (2006.01)
*B32B 5/26* (2006.01)
*B32B 7/12* (2006.01)
*B29L 31/30* (2006.01)
*B64C 1/00* (2006.01)

(52) U.S. Cl.
CPC ..... *B32B 2262/106* (2013.01); *B32B 2556/00* (2013.01); *B32B 2605/18* (2013.01); *B64C 1/062* (2013.01); *B64C 2001/0072* (2013.01); *Y02T 50/433* (2013.01); *Y10T 428/20* (2015.01); *Y10T 428/219* (2015.01); *Y10T 428/2476* (2015.01)

(56) References Cited

U.S. PATENT DOCUMENTS

| | | | | |
|---|---|---|---|---|
| 3,133,587 | A * | 5/1964 | Wolfe | B29C 73/10 152/367 |
| 3,814,645 | A * | 6/1974 | Fletcher | B29C 73/00 156/153 |
| 3,960,626 | A * | 6/1976 | Casadevall | B29C 70/202 156/181 |
| 4,517,038 | A * | 5/1985 | Miller | B29C 73/10 156/94 |
| 4,568,589 | A * | 2/1986 | Briggs | B29C 73/10 156/94 |
| 5,175,973 | A * | 1/1993 | Owen | E02D 5/226 405/216 |
| 5,868,886 | A | 2/1999 | Alston et al. | |
| 5,968,639 | A | 10/1999 | Childress | |
| 6,149,749 | A | 1/2000 | McBroom | |
| 6,174,392 | B1 * | 1/2001 | Reis | B29C 73/06 156/58 |
| 8,356,649 | B2 | 1/2013 | Cacace et al. | |
| 2002/0028332 | A1 | 3/2002 | Pratt | |
| 2004/0016467 | A1 * | 1/2004 | Blackmore | F16L 55/179 138/99 |
| 2005/0063688 | A1 * | 3/2005 | Jackson | 392/451 |
| 2009/0068365 | A1 * | 3/2009 | Obermeyer | B29C 65/4845 427/385.5 |
| 2009/0214293 | A1 * | 8/2009 | Wheatley | E01C 11/005 404/67 |
| 2010/0098896 | A1 * | 4/2010 | Rice | B29C 73/10 428/63 |
| 2012/0080135 | A1 | 4/2012 | Evens et al. | |
| 2012/0251763 | A1 * | 10/2012 | Yamamoto et al. | 428/68 |
| 2014/0360644 | A1 * | 12/2014 | Miyazono | B60C 9/0057 152/451 |

FOREIGN PATENT DOCUMENTS

| | | |
|---|---|---|
| EP | 1782942 B2 | 4/2013 |
| JP | 2013151228 A | 8/2013 |
| WO | WO 2011074437 A1 * | 6/2011 |

OTHER PUBLICATIONS

Search Report for related European Application No. EP14183702.1; report dated Mar. 19, 2018.

* cited by examiner

COMPOSITE TEXTILES INCLUDING SPREAD FILAMENTS

BACKGROUND

Fiber reinforced plastic (FRP) composites are attractive for aerospace structural applications. They have better specific strength and stiffness than metal, which translates into weight savings, fuel savings, and lower operating costs.

FRP structural elements such as skins, stiffeners, frames and spars may be joined together to form major components such as wings, fuselage and empennage. Disbonds of these FRP elements are undesirable.

SUMMARY

According to an embodiment herein, an article comprises a multi-directional textile of first reinforcing fiber tows extending in a first direction and second reinforcing fiber tows extending in a second direction. Filaments in the first fiber tows extend past a boundary of the textile and are spread. The tows are embedded in resin.

According to another embodiment herein, a structure comprises first and second parts joined together. The first part includes multiple layers of reinforcing fibers. An outer one of the layers includes a multi-dimensional textile of tows having spread filaments joined to a surface of the second part.

According to another embodiment herein, a method of fabricating a composite structure comprises mating first and second parts. The first part includes an outer layer having a weave of first tows extending in a first direction and second tows extending in a second direction. The method further comprises spreading ends of the tows into individual filaments, and joining the spread filaments to the surface of the second part.

These features and functions may be achieved independently in various embodiments or may be combined in other embodiments. Further details of the embodiments can be seen with reference to the following description and drawings.

DETAILED DESCRIPTION

Figure 1A:
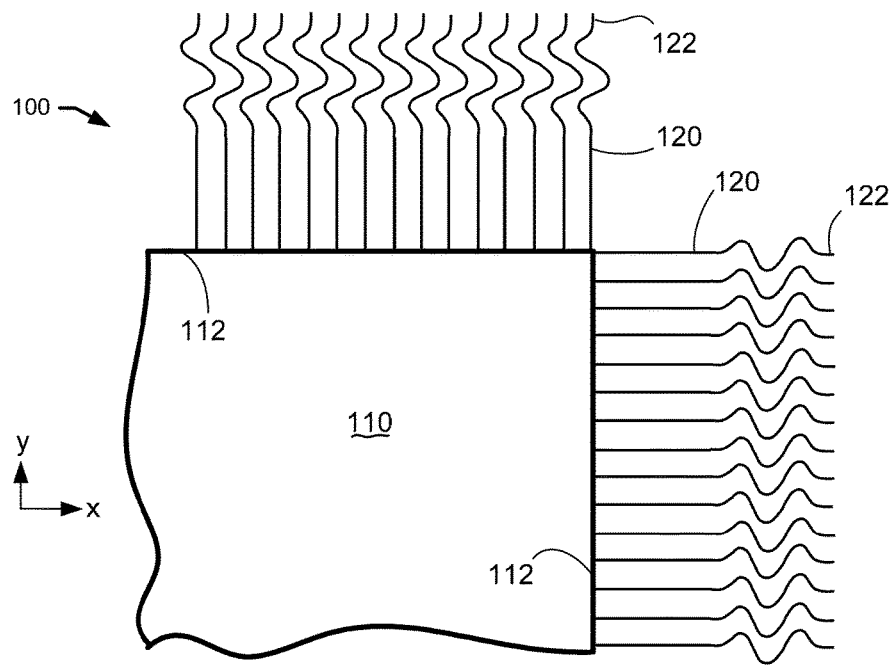
FIGS. 1A and 1B are illustration of multi-directional composite textiles having spread filaments.

Reference is made to FIG. 1A, which illustrates an article 100 comprising a multi-directional composite textile 110 of first reinforcing fiber tows extending in a first direction and second reinforcing fiber tows extending in a second direction. In some embodiments, the multi-directional textile 110 may be a weave of tows extending in the x-direction and tows extending in the y-direction. In the embodiment illustrated in FIG. 1A, the x- and y-directions are orthogonal. The multi-directional textile 110 has a boundary 112. Within the boundary 112 of the textile 110, the tows provide structural strength along the x- and y-directions.

A typical fiber tow may include thousands (e.g., 1K, 3K 12K, 24K) of fibers. Individual fibers or filaments of each tow may be bundled into a number (N) of rows. The bundled filaments in a tow are typically held together (that is, supported) by cross-fibers. The cross-fibers are typically orthogonal to the filaments 120.

Filaments 120 of the tows extend past the boundary 112. These filaments 120 only provide structural strength in the direction in which they extend. The filaments 120 have relaxed to no support in the orthogonal direction. Support may be relaxed, for instance, by using only a small percentage (e.g., 10% to 30%) of cross-fibers that would normally be used in a tow. In the example of FIG. 1A, consider the tows extending in the x-direction and their filaments 120 extending past the boundary 112. The filaments 120 provide structural strength in the x-direction. No cross-fibers are used to support these filaments 120. Similarly, the filaments 120 extending past the boundary 112 in the y-direction provide strength only in the y-direction. No cross-fibers are used to support these filaments 120.

This relaxed or lack of structural support in the orthogonal direction enables the filaments 120 to be "spread." When compressed, the filaments 120 are redistributed such that the number (N) of rows is reduced. In the textile 110 of FIG. 1A, the filaments 120 extending past the boundary 112 are spread.

Figure 2A:
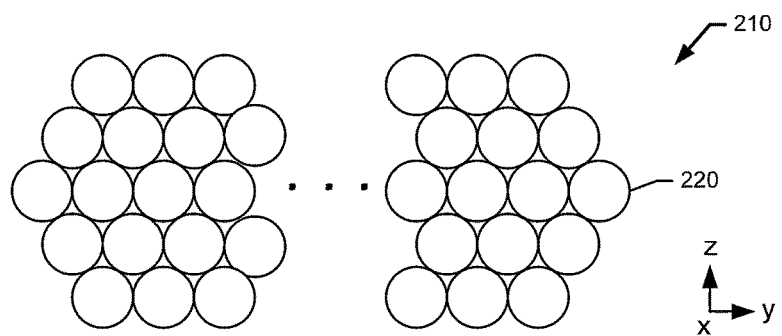
FIGS. 2A and 2B are illustrations of tow filaments before and after they are spread.
Figure 2B:
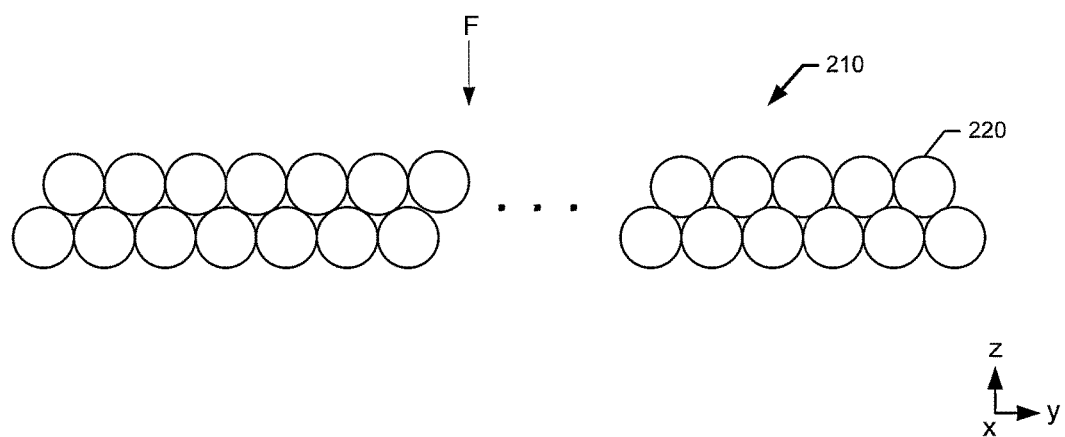

FIGS. 2A and 2B illustrate a tow 210 in a textile before and after its filaments 220 have been spread. FIG. 2A illustrates the tow 210 having N=5 rows of filaments 220 prior to the filaments 210 being spread. When a compressive force (F) is applied to the unsupported or loosely supported portion of the tow 210 in the z-direction, the compressive force causes the filaments 220 to spread in an orthogonal (y) direction. FIG. 2B shows the filaments 220 after having been spread. In the example of FIG. 2B, the number rows of spread filaments 220 is reduced from five to two. Width of the spread filaments 220 may be greater than width of the fully supported filaments in the tow 210.

Reference is once again made to FIG. 1A. Reducing or eliminating the cross-fibers also reduces the axial stiffness of the filaments 120 extending past the boundary 112. That is, the textile 110 is softer outside the boundary 112 than within the boundary 112.

Stiffness of the filaments 120 outside the boundary 112 may be further reduced by making some or all of the filaments ends 122 wavy. FIG. 1A illustrates filaments 120 having straight portions that terminate in wavy ends 122. The wavy ends 122 lie in the x-y plane. Since the filaments 120 also lay in the same plane, the waviness is said to be "in-plane."

Thus, the textile 110 has a variable stiffness. Stiffness is highest within the boundary 112, it is reduced outside the boundary 112, and may be further reduced at the wavy ends 122. Filaments 120 picking up loads at their ends will undergo less strain than filaments within the boundary 112.

For the textile 110 illustrated in FIG. 1A, the straight portions of the filaments outside the boundary 112 will transmit loads. Wavy ends 122 of the filaments will not transmit loads.

Figure 1B:
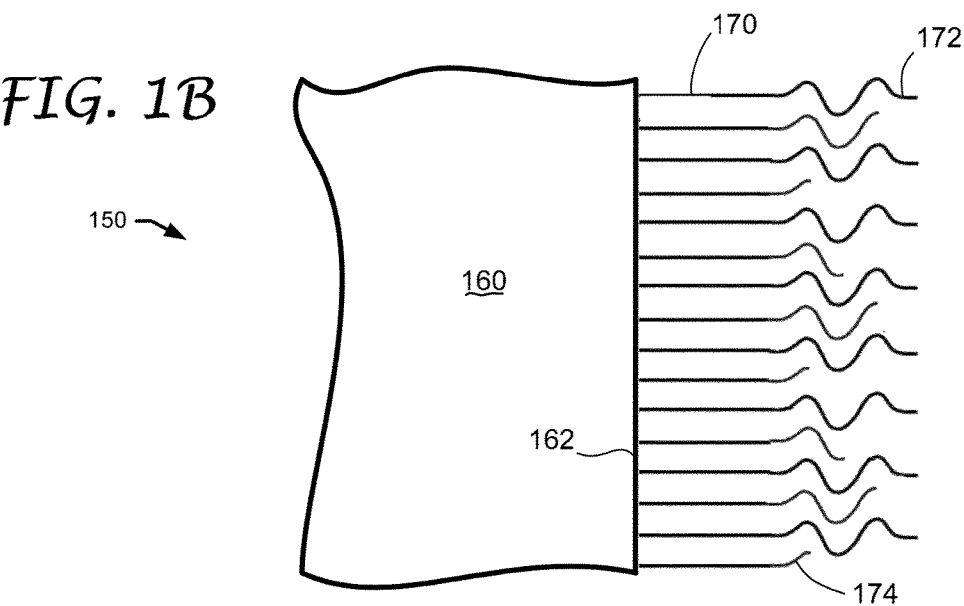

Reference is now made to FIG. 1B, which illustrates another example of an article 150 including a composite textile 160 of tows. Filaments 170 extend beyond a boundary 162 of the tows. Load transition may be tailored by varying the length of the filaments 170 so that the filaments pick up the loads at different locations. Load transition may be further tailored by making some ends 172 of the filaments 120 wavy and some ends 174 straight.

The articles 100 and 150 of FIGS. 1A and 1B further include resin (not shown). The textiles 110 and 160 are embedded in the resin. As a first example, the tows and spread filaments are infused with resin matrix just prior to curing. As a second example, the tows are pre-impregnated with resin matrix prior to layup. As a third example, the tows are tacked together with a partially cross-linked resin to facilitate storage and transport before final processing.

Figure 3:
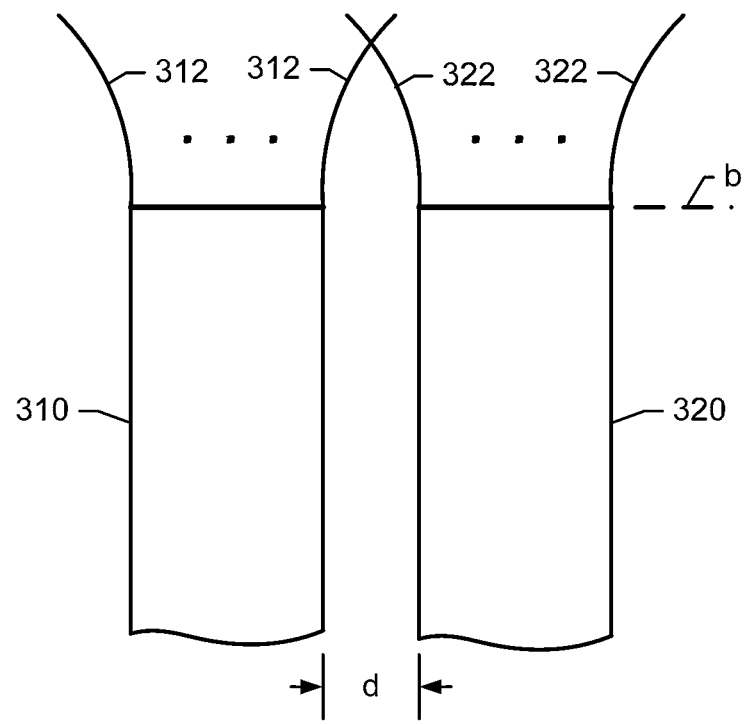
FIG. 3 is an illustration of adjacent tows having filaments that are spread.

Reference is made to FIG. 3, which illustrates an example of first and second tows 310 and 320 that are separated by a distance d. As filaments 312 in the first tow 310 are spread, the width of the spread fibers may exceed the width of the first tow 310. The same may be true for filaments 322 of the second tow 320. Consequently, some filaments 312 extending from the first tow 310 may be intermixed with some filaments 322 extending from the second tow 320 (FIG. 3 shows only two intermixed filaments 312 and 322 to illustrate this aspect).

Figure 4:
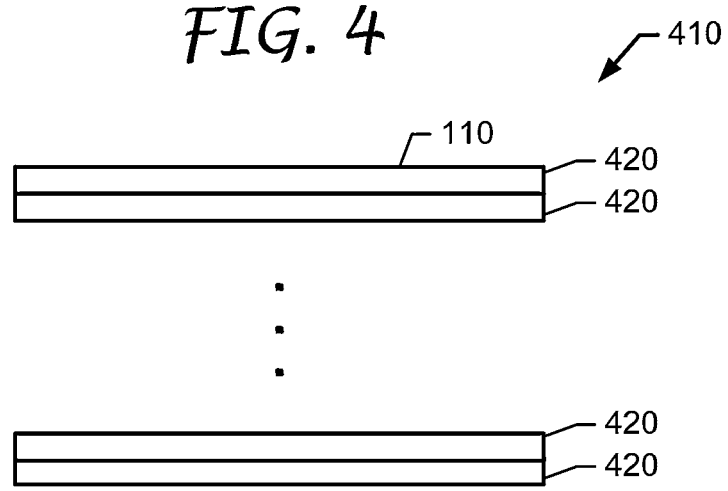
FIG. 4 is an illustration of a ply stack including a composite textile of tows having spread filaments.

Reference is now made to FIG. 4, which illustrates a ply stack 410. The ply stack 410 includes multiple layers 420. One or more of the outermost layers 420 of the ply stack 410 may includes a multi-dimensional textile herein (FIG. 4 shows a textile herein at only one outer layer). The remaining layers 410 may include conventional tows.

The ply stack 410 is not limited to any particular part or structure. Two examples will now be provided.

Figure 5:
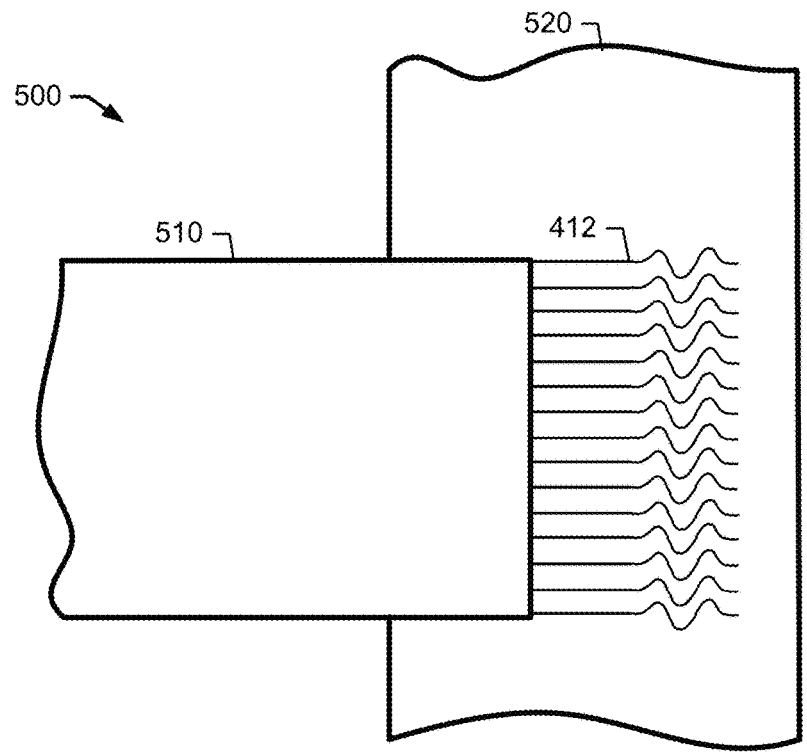
FIG. 5 is an illustration of a part including the ply stack of FIG. 4, the part joined to another part.

Reference is now made to FIG. 5, which illustrates a first example in which a first part 510 is joined to a second part 520. As but one example, the first part 510 may be a beam and the second part 520 may be a panel. The first part 510 includes the ply stack 410. Filaments 412 extending from an outer layer of the ply stack 410 are located on a surface of the second part 520. The parts 510 and 520 may be joined by bonding, co-bonding, or co-curing. Co-curing refers to joining the parts 510 and 520 while both parts 510 and 520 are green (that is, uncured). Co-bonding refers to joining the parts 510 and 520 while one of the parts is green and the other has already been cured or otherwise formed. Bonding refers to joining of the two parts 510 and 520 after the two parts 510 and 520 have already been cured.

The filaments 412 improve the joining of the two parts 510 and 520. Having thousands of filaments 412 individually joined to the second part 520 greatly reduces the potential for disbonds. Since each filament 412 is independent of the others, disbonds of hundreds or thousands of filaments would have to occur to amount to anything of significance.

In-plane waviness of the filament ends offers added benefits. The waviness pick up little to no load.

Figure 6:
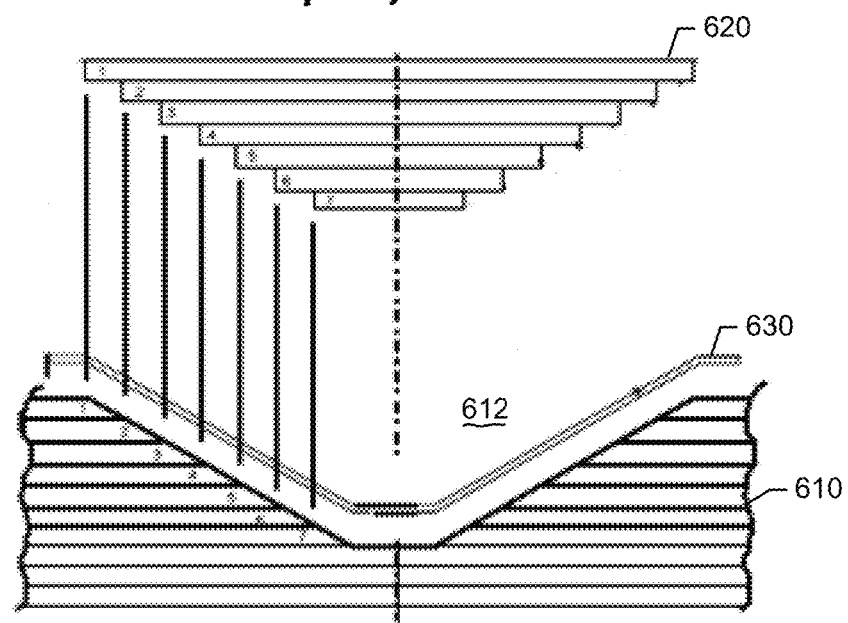
FIG. 6 is an illustration of a patch for a carbon fiber reinforced plastic panel.

Reference is made to FIG. 6, which illustrates the second example: patching a panel 610 that includes multiple layers of carbon reinforcing fibers embedded in a plastic matrix. In each layer, the carbon fibers extend unidirectionally at a specific angle (e.g., 0 degrees, +45 degrees, −45 degrees and 90 degrees).

A damaged region of the panel 610 is scarfed out. In the example of FIG. 6, the scarfed region 612 is seven layers deep and scarfed at an angle.

A patch 620 for the panel 610 includes a ply stack. The plies of the stack correspond to the layers of the panel 610 that were removed. Thus, each ply of the patch 620 is sized and shaped to replace a panel layer that was removed. In addition, each ply may have the same fiber orientation as the panel layer that was removed. A boundary of the top ply roughly coincides with the opening in the upper layer of the panel 610.

In the patch 620 of FIG. 6, the top ply includes a multi-directional weave of tows. Spread filaments (not shown) extend beyond the boundary of the weave. For example, spread filaments extend across four edges. Ends of the filaments may have in-plane waviness. The remaining plies of the patch 620 may include traditional weaves or unidirectional fibers tows.

A layer of adhesive 630 may be placed on the scarfed region 612 of the panel 610. The patch 620 is placed in the scarfed region 612. The filaments extending beyond the boundary of the weave are located on and joined to the upper surface of the panel 610.

Thousands of spread filaments extend from the patch 620, across a joint formed between the patch 620 and the panel 610, and onto the panel 610. The spread filaments create thousands of individual bonds to the panel 610, which prevents peeling of the patch 620 from the panel 610. The wavy ends of the filaments may pick up loads, but they do not transmit the loads to the rest of the patch, which further prevents peeling of the patch 620 from the panel 610.

A textile herein is not limited to the joining of a first composite part to a second composite part. The second part may be made of metal or another non-composite material. Spread filaments extending past a joint between the two parts may be adhesively bonded to the metal part.

A textile herein is not even limited to the joining of one composite part to a non-composite part. Consider the example of FIG. 6, except that both panel and patch are made of metal instead of a fiber reinforced plastic. The metal patch may be bonded within a damaged region of the metal panel, and a textile herein may cover the metal patch, with its spread filaments extending past the joint and onto a surface of the metal panel. In addition to retaining the metal patch in the panel, the textile may provide a barrier to moisture ingress.

A textile herein is not limited to the patterns illustrated in FIGS. 1A and 1B. A textile herein is not limited to filaments extending in first and second directions that are orthogonal.

Figure 7:
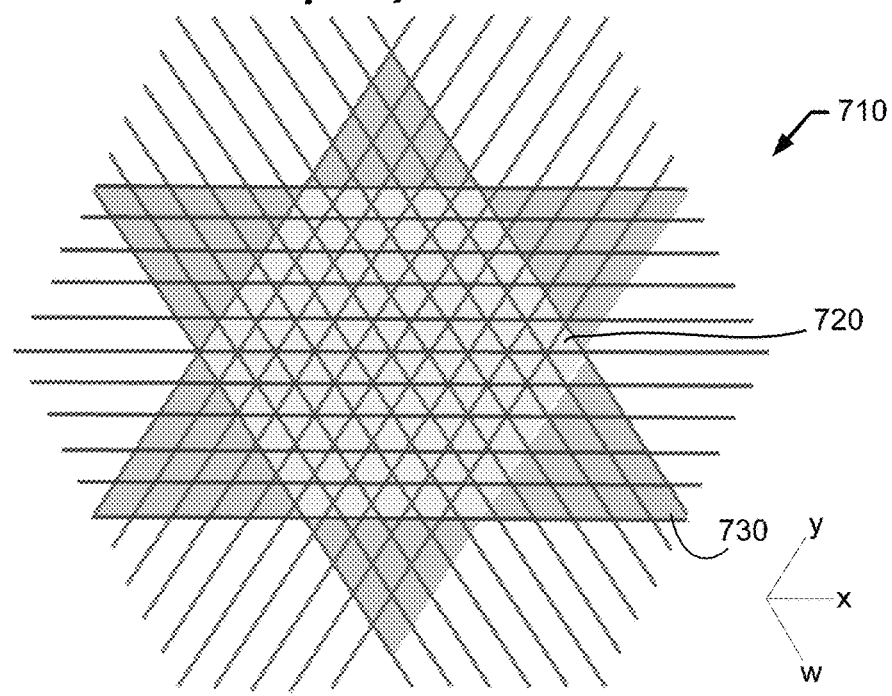
FIGS. 7 and 8 are illustrations of composite textiles having spread filaments.

FIG. 7 illustrates a textile 710 including a triaxial braid of tows extending in three directions (w, x and y). A central portion 720 of the textile 710 is formed from overlapping tows extending in all three directions. Peripheral portions 730 of the textile 710 are formed from tows extending in two of the three directions. For instance, the lower right peripheral portion 730 of the textile 710 is formed from tows extending in the w and y directions. Filaments extending past a boundary of the textile 710 are spread.

Figure 8:
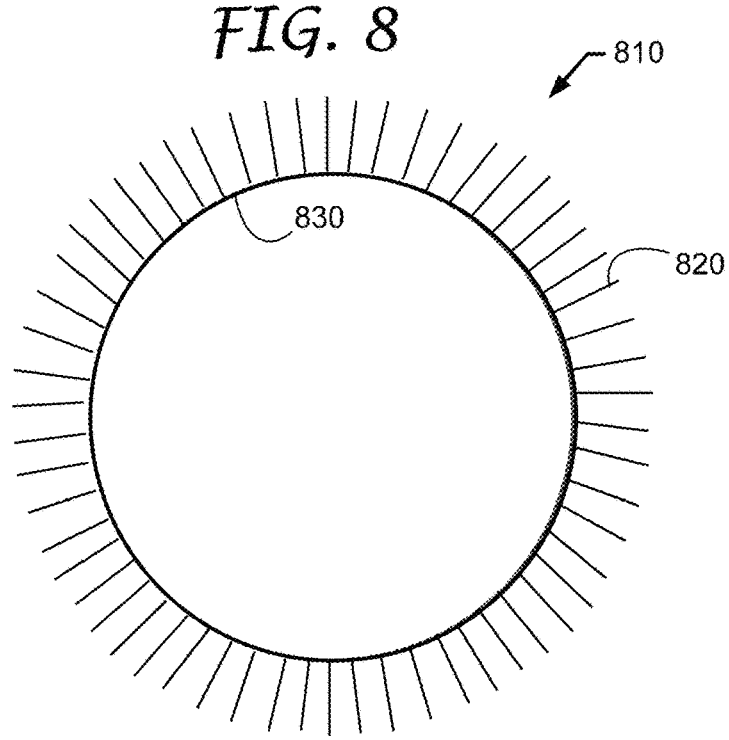

FIG. 8 illustrates a textile 810 having a circular boundary 830 and filaments 820 extending past the circular boundary 830. This textile 810 may be formed by cutting a multi-dimensional weave into a circular shape, pulling out individual filaments at the boundary, and arranging those individual filaments orthogonal to the boundary 830.

A multi-directional textile herein is not limited to a weave or braid. In other embodiments, the multi-directional textile 110 includes a laminate of multiple layers of tows, with the tows of each layer being unidirectional. For example, a first layer includes tows extending in the x-direction and a second layer includes tows extending in the y-direction. Strength is provided in the x and y-directions by those portions of the layers that overlap.

A textile herein is not limited to all filaments extending past a boundary. In some embodiments, only some filaments may extend past a boundary, while other filaments extending in the same direction are terminated at the boundary. An advantage of terminating some of the filaments at the boundary is that it is easier to spread the fibers extending past the boundary.

In a textile herein, all filaments may have the same modulus and same coefficient of thermal expansion. However, a textile herein is not so limited.

In a textile herein, all filaments may have the same composition. For example, a textile herein may have only carbon filaments. However, a textile herein is not so limited, and some embodiments may have filaments of different composition. For example, a textile herein may have a combination of glass filaments and carbon filaments. The use of glass filaments may result in a higher strain at load. Consider the example of FIG. 1B. Carbon filaments having wavy ends may be replaced by glass fibers having straight ends.

A textile herein is not limited to tows of any particular width, or any particular number of filaments. Tows may include thousands of filaments.

Figure 9:
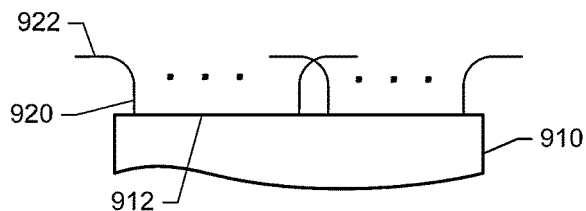
FIG. 9 is an illustration of filaments with wavy ends.

In a textile herein, the filaments are not limited to wavy ends having sinusoidal shapes. In some embodiments, the filaments 920 of a textile 910 may have wavy ends 922 that are bent parallel to the textile's boundary 912, as illustrated in FIG. 9.

Figure 10:
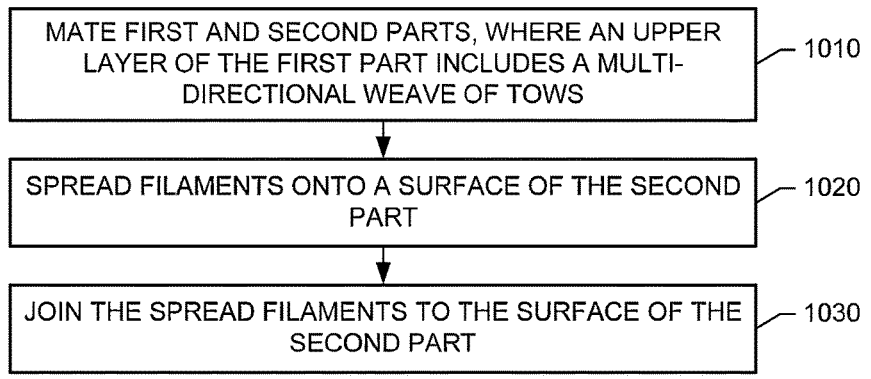
FIG. 10 is an illustration of a general method of using a composite textile having spread filaments.

Reference is now made to FIG. 10, which illustrates a general method of using a textile herein. At block 1010, first and second parts are mated. The first part includes an outer layer having a weave of first tows extending in a first direction and second tows extending in a second direction. End portions of the first tows extend onto a surface of the second part. Adhesive may be placed on faying surfaces of the first and second parts.

At block 1020, the end portions of the tows are spread into individual filaments. Pressure may be applied (e.g., by a roller) to the end portions to cause the filaments to spread. The filaments may be combed to further ensure that the filaments are spread. Adhesive may also placed on the spread filaments.

At block 1030, the first part is joined to the second part, whereby faying surfaces of the parts are joined together, and the spread filaments are joined to the surface of the second part. Depending on the composition and the degree of cure of the parts, the joining may be performed by co-curing, co-bonding, or bonding. Heat and pressure during curing or bonding may be applied by an autoclave. If the first part is a patch, heat and pressure may be applied by a heat blanket.

Figure 11:
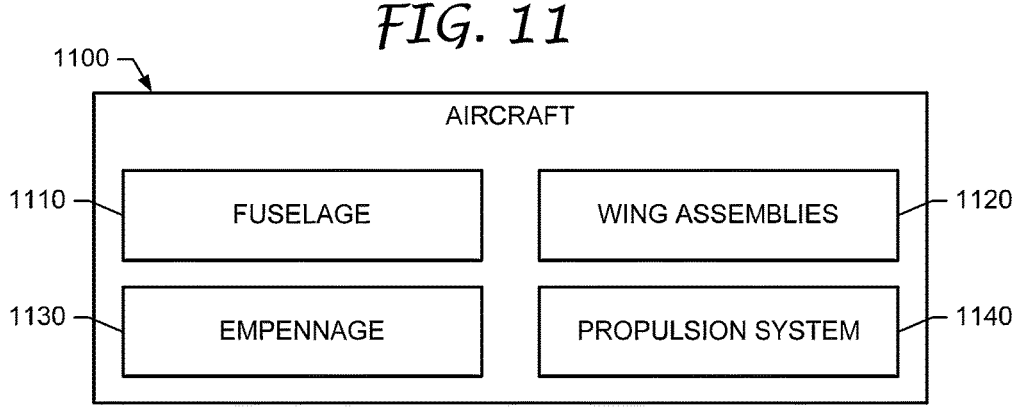
FIG. 11 is an illustration of an aircraft.

Reference is made to FIG. 11, which illustrates an aircraft 1100 including a fuselage 1110, wing assemblies 1120, and empennage 1130. A propulsion system 1140 including one or more propulsion units are coupled to the fuselage 1110, wing assemblies 1120 or other portions of the aircraft 1100. FRP structural elements such as skins, stiffeners, frames and spars may be joined together to form the fuselage 1110, wing assemblies 1120 and empennage 1130. Textiles herein may be used in these FRP structural elements. Consider the example of beam having an FRP flange that is bonded and/or fastened to a skin panel. The beam may be used to stiffen the skin panel. A textile herein is used in the outer layer of the flange. Individual filaments extending from the textile are joined to the skin panel. The filaments may extend lengthwise from the flange and/or transversely from the flange.

Textiles herein may also be used to patch damaged portions of the fuselage 1110, wing assemblies 1120 and empennage. Certain areas of the aircraft 1100 may be vulnerable to erosion damage and/or impact damage. A textile herein may be used to patch the damage as described above. The individual filaments of the textile prevent the patch from peeling. Wavy ends of the filaments further prevent the patch from peeling.

The patch also reduces damage after impact. If a patched area is once again impacted by debris, the wavy ends of the filaments pick up the impact loads, but do not transmit the impact loads to the rest of the patch.

The invention claimed is:

1. An aircraft structural element comprising a multi-directional textile including first reinforcing fiber tows extending in a first direction and second reinforcing fiber tows extending in a second direction within a boundary of the multi-directional textile, each tow of the first and second reinforcing fiber tows in the textile including an untwisted bundle of filaments arranged in a number of rows, the filaments of the first reinforcing fiber tows extending past the boundary of the multi-directional textile and being spread so that the number of rows of filaments is reduced past the boundary, the first and second reinforcing fiber tows being embedded in resin, at least some of the spread filaments extending past the boundary being straight and terminating at nonwoven sinuous wavy ends, the nonwoven sinuous wavy ends exhibiting waviness in an x-y plane and having no variation in a z-plane.

2. The aircraft structural element of claim 1, wherein filaments in the second tows also extend past the boundary of the textile and are spread.

3. The aircraft structural element of claim 1, wherein the filaments within the boundary of the textile provide structural strength along the first and second directions, and wherein those filaments extending past the boundary provide structural strength in only the first direction.

4. The aircraft structural element of claim 1, wherein the spread filaments extending past the boundary are individually joined to a surface of a second part.

5. The aircraft structural element of claim 1, wherein the textile includes a weave of the tows.

6. The aircraft structural element of claim 5, wherein the filaments extending past the boundary have sparse to no support by cross-fibers.

7. The aircraft structural element of claim 1, wherein the textile includes a braid of tows extending in first, second and third directions.

8. The aircraft structural element of claim 1, wherein the textile has a circular boundary and wherein the filaments extending past the boundary are normal to the boundary.

9. The aircraft structural element of claim 1, wherein the first and second reinforcing fiber tows of the multi-directional textile extend in the x-y plane, and wherein the sinuous wavy ends of the spread filaments exhibit waviness in the same x-y plane as the multi-directional textile.

10. The aircraft structural element of claim 1, wherein the filaments extending past the boundary are terminated at different lengths.

11. A layup comprising a plurality of layers of reinforcing fibers and an outer layer including the multi-directional textile of claim 1, only the outer layer of the layup including the spread filaments.

12. An aircraft structural element comprising first and second parts joined together, the first part including multiple layers of reinforcing fibers, an outer one of the layers including a multi-dimensional textile of first reinforcing fiber tows extending in a first direction and second reinforcing fiber tows extending in a second direction, the first reinforcing fiber tows and the second reinforcing fiber tows being located within a boundary of the multi-directional textile, each tow of the first and second reinforcing fiber tows in the textile including an untwisted bundle of filaments arranged in a number of rows, the filaments of the first reinforcing fiber tows extending past the boundary of the multi-directional textile and being spread so that the number of rows of filaments is reduced past the boundary, the first and second reinforcing fiber tows being embedded in a resin, the spread filaments of the first reinforcing fiber tows being joined to a surface of the second part, at least some of the spread filaments extending past the boundary being straight and terminating at nonwoven sinuous wavy ends, the nonwoven sinuous wavy ends exhibiting waviness in an x-y plane and having no variation in a z-plane.

13. The aircraft structural element of claim 12, wherein the first and second parts are discrete parts.

14. The aircraft structural element of claim 13, wherein the discrete parts are aircraft structural elements.

15. The aircraft structural element of claim 12, wherein the first part is a patch for the second part.

16. The aircraft structural element of claim 15, wherein the second part is located at an area of an aircraft that is susceptible to impact damage.

17. A method of fabricating a composite structure for an aircraft, comprising:
mating first and second parts, wherein the first part includes an outer layer having a multi-directional textile of first tows extending in a first direction and second tows extending in a second direction, the first reinforcing fiber tows and the second reinforcing fiber tows being located within a boundary of the multi-directional textile, each of the first and second tows including an untwisted bundle of filaments arranged in a number of rows, the first and second tows being embedded in a resin;
spreading filaments past a boundary of the textile by compression of the untwisted bundle of filaments so that the number of rows of filaments in each tow is reduced past the boundary, at least some of the spread filaments extending past the boundary being straight and terminating at nonwoven sinuous wavy ends, the nonwoven sinuous wavy ends exhibiting waviness in an x-y plane and having no variation in a z-plane; and
joining the spread filaments to a surface of the second part.

18. The method of claim 17, wherein the first and second parts are aircraft structural elements.

19. The method of claim 17, wherein the first part is a patch for the second part, which is an aircraft structural element.

* * * * *